United States Patent
Treharne

(10) Patent No.: US 10,604,025 B2
(45) Date of Patent: Mar. 31, 2020

(54) BATTERY CHARGING SYSTEMS AND METHODS

(71) Applicant: Ford Global Technologies, LLC, Dearborn, MI (US)

(72) Inventor: William David Treharne, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 151 days.

(21) Appl. No.: 15/837,248

(22) Filed: Dec. 11, 2017

(65) Prior Publication Data

US 2019/0176632 A1    Jun. 13, 2019

(51) Int. Cl.
*B60L 53/14* (2019.01)
*B60L 58/12* (2019.01)

(52) U.S. Cl.
CPC ............ *B60L 53/14* (2019.02); *B60L 58/12* (2019.02); *B60L 2260/58* (2013.01)

(58) Field of Classification Search
CPC ...................................................... B60L 58/12
USPC ......................................................... 320/155
See application file for complete search history.

(56) References Cited

U.S. PATENT DOCUMENTS

| | | | |
|---|---|---|---|
| 8,624,560 B2 | 1/2014 | Ungar et al. | |
| 2008/0150491 A1 | 6/2008 | Bergveld et al. | |
| 2008/0197812 A1* | 8/2008 | Maireanu | H02J 7/0068 320/145 |
| 2012/0098488 A1* | 4/2012 | Ichikawa | B60L 53/18 320/109 |
| 2014/0347012 A1 | 11/2014 | Shim et al. | |
| 2015/0066224 A1 | 3/2015 | Uyeki | |

* cited by examiner

Primary Examiner — Edward Tso
Assistant Examiner — Ahmed H Omar
(74) Attorney, Agent, or Firm — David Kelley; Brooks Kushman, P.C.

(57) ABSTRACT

A vehicle includes a traction battery and a power interface configured to receive power from an off-board source. The vehicle also includes a controller programmed to charge the traction battery with the power until expiration of an estimated remaining charge time, and to periodically reduce the remaining charge time by an update decrement amount that increases as an amount that an estimated state of charge (SOC) is less than a measured SOC increases.

14 Claims, 3 Drawing Sheets

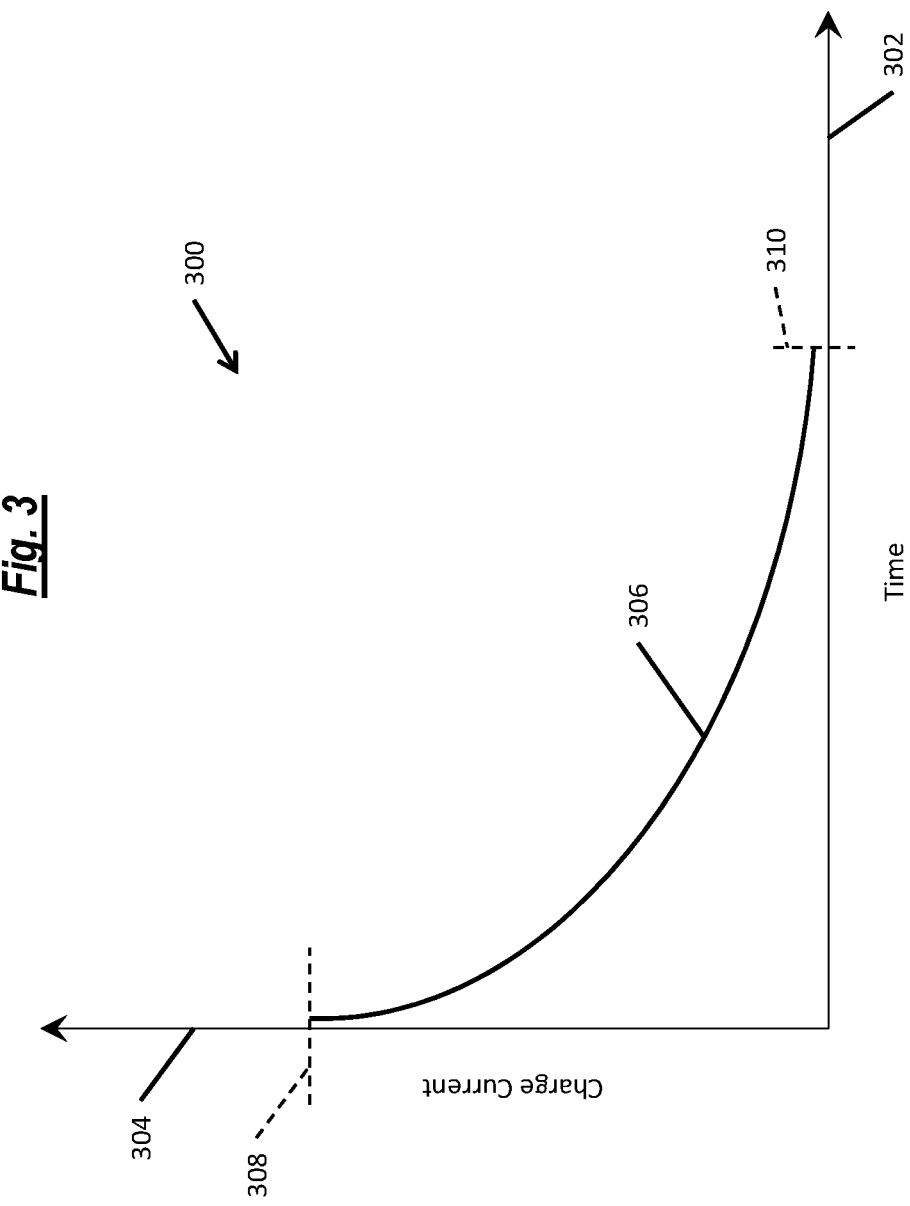

BATTERY CHARGING SYSTEMS AND METHODS

TECHNICAL FIELD

The present disclosure relates to battery systems for electrified vehicles.

BACKGROUND

Vehicles having an electrified propulsion source such as hybrid-electric vehicles can include at least one electric machine that may be configured as an electric motor or as an electric generator. A traction battery provides power to the electric machine for propulsion and may also supply certain accessory loads. The traction battery has a state of charge (SOC) that indicates how much electric charge is held in the battery. To increase the SOC, multiple methods may be used including charging the traction battery using the momentum of the vehicle to turn a generator, operating a combustion engine to turn the electric machine configured as a generator, and electrically coupling the traction battery to an external charging source, also referred to as "plugging in" the vehicle. Based on the chemistry of the traction battery, along with other operating conditions, recharging behaviors may differ across various SOC values.

SUMMARY

A vehicle includes a traction battery and a power interface configured to receive power from an off-board source. The vehicle also includes a controller programmed to charge the traction battery with the power until expiration of an estimated remaining charge time, and to periodically reduce the remaining charge time by an update decrement amount that increases as an amount that an estimated state of charge (SOC) is less than a measured SOC increases.

A method of controlling vehicle battery charging includes regulating current from a power interface to charge the battery based on a battery SOC, and charging the battery with the current until expiration of an estimated remaining charge time. The method also includes periodically reducing the remaining charge time by an update decrement amount that increases as an amount that an estimated SOC is less than a measured SOC increases.

A vehicle includes a traction battery and a a power interface configured to receive current from an off-board power source. The vehicle also includes a controller programmed to store a plurality of recharge profiles each corresponding to different vehicle operating conditions and regulate current based on one of the recharge profiles to charge the traction battery until expiration of an estimated remaining charge time. The controller is also programmed to maintain the remaining charge time responsive to an estimated state of charge (SOC) being greater than a measured SOC.

BRIEF DESCRIPTION OF THE DRAWINGS

FIG. 3 is an example of a current-time relationship for a recharge procedure.

DETAILED DESCRIPTION

Figure 1:
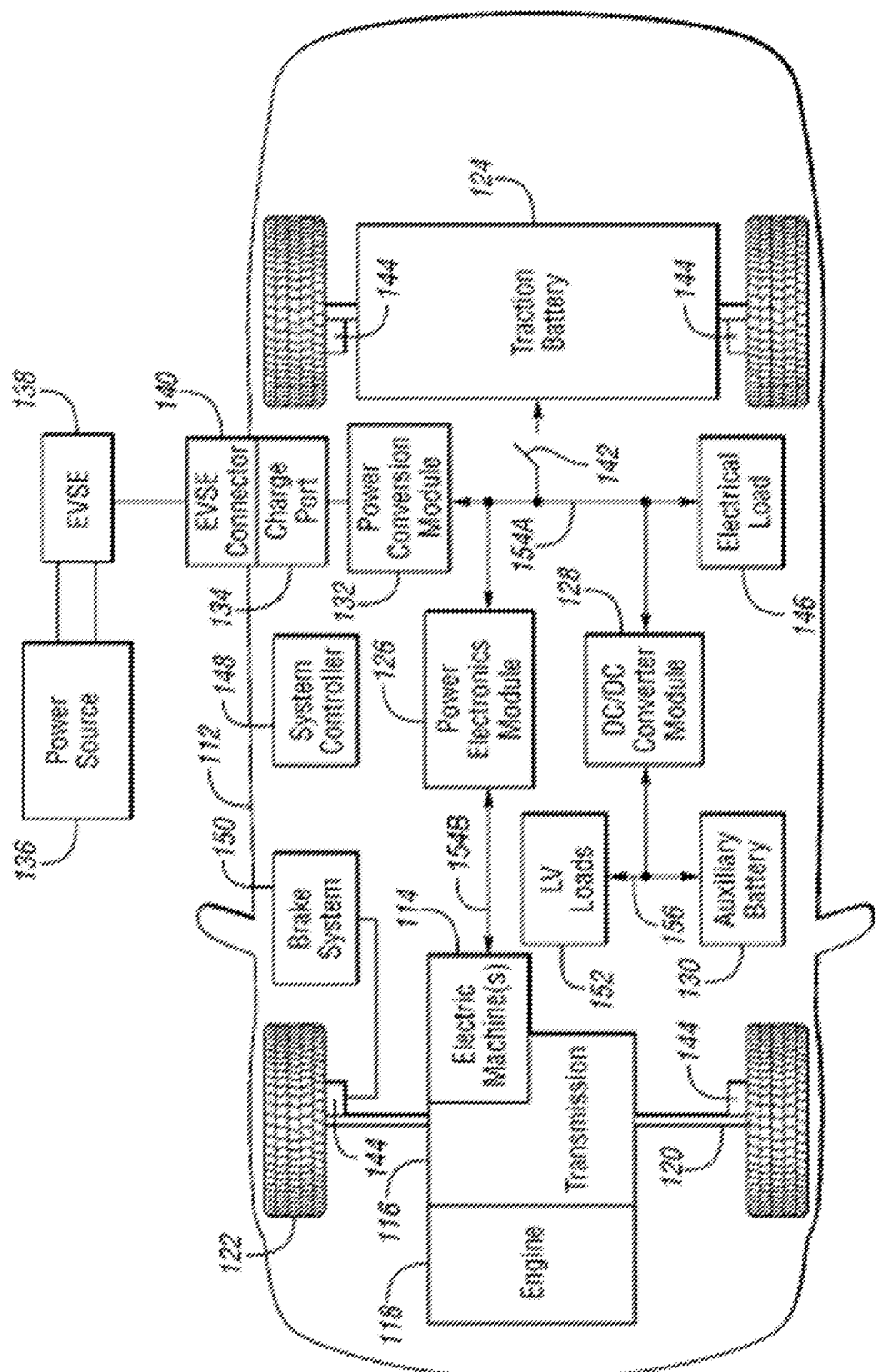
FIG. 1 is a vehicle having an electrified propulsion source.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As an electrified vehicle is operated, the state of charge (SOC) of the traction battery varies related to power depletion as well as recharge cycles. It may be desirable to maximize the utilization of the energy stored in the battery by converting the electric energy to propulsive power for the vehicle. When the vehicle is at rest, the vehicle can be plugged in to a utility power grid to recharge the battery. The rate at which a plug-in hybrid vehicle recharges from an electric charge station can be limited by station factors including the rating of the outlet the charge station. Examples of limitations include a 110V AC outlet with a 15 amp circuit breaker providing a maximum of about 1.4 kilowatts of charging power, or a 240V AC outlet with a 50 amp circuit breaker providing a maximum of 12 kilowatts of charging power. The maximum charge rate can also be reduced due to losses in converting AC current into DC current for receipt at the battery. Alternatively, an internal combustion engine turning a generator may output as much as 35 kilowatts or more. In some cases, charging the battery using the engine as the power source can enable significantly faster charging compared to charging with a standard 110V, 15 amp AC outlet. However, once plugged-in, a vehicle operator typically desires to maximize utilization of the electric energy from the utility company to obtain the fastest possible recharge time.

During recharge cycles, it may be desirable to display to a user the time remaining for the current charge cycle and dynamically update the remaining charge time according to physical properties of the battery. As discussed in more detail below, the current applied during a battery charge cycle may be adjusted to influence the battery voltage thereby avoiding battery damage near peak charge. For example, a unique recharge procedure may be implemented in a SOC range near full charge (e.g., in a range of 80-100% SOC). Aspects of the present disclosure allow a remaining charge time prediction based on one or more non-linear recharge functions. Related to variance in the battery recharge, other aspects include incrementing or decrementing the remaining charge time based on a difference between an actual voltage and an estimated voltage. Thus the remaining charge time prediction may be adjusted based on the real-time actual charging rate to compensate for errors in the prediction on a minute by minute basis.

FIG. 1 depicts a plug-in hybrid-electric vehicle (PHEV) 112. The PHEV 112 includes one or more electric machines 114 mechanically coupled to a hybrid transmission 116. The electric machines 114 may be capable of operating as a motor or a generator. In addition, the hybrid transmission 116 is mechanically coupled to a combustion engine 118. The hybrid transmission 116 is also mechanically coupled to a drive shaft 120 that is mechanically coupled to road wheels 122. The electric machines 114 can provide propulsion as well as deceleration capability either while the engine 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the PHEV 112 may be operated in electric-only mode using the electric machines 114 as the sole source of propulsion.

A traction battery or battery pack 124 stores energy that can be used by the electric machines 114. The battery pack 124 typically provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. For example, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., 12V battery). The low-voltage loads 152 may be electrically coupled to the low-voltage bus 156. The low-voltage loads 152 may include various controllers within the vehicle 112.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 includes a charge connector 140 for plugging into a charge port 134 of the vehicle 112. The charge port 134 may be any type of port configured to transfer power from the EVSE 138 to the vehicle 112. The charge port 134 may be electrically coupled to a charger or onboard power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 112. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate operation of the brake system 150. The brake system 150 monitors the brake components and controls the wheel brakes 144 for vehicle deceleration. The brake system 150 also responds to driver commands via brake pedal input and may also operate to automatically implement features such as stability control. The controller of the brake system 150 may implement a method of applying a requested brake force when requested by another controller or sub-function.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include compressors and electric heaters. For example, the air conditioning system may draw as much as 6 kW under high cooling loads.

The various components discussed may have one or more associated controllers to control and monitor the operation of the components. The controllers may communicate via a serial bus (e.g., Controller Area Network (CAN)) or via discrete conductors. In addition, a vehicle system controller 148 may be present to coordinate the operation of the various components.

When the vehicle 112 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

System controller 148, although represented as a single controller, may be implemented as one or more controllers. The controller 148 may monitor operating conditions of the traction battery 124, the power conversion module 132 and the electric machine 114. The traction battery 124 includes a current sensor to sense a current that flows through the traction battery 124. The traction battery 124 also includes a voltage sensor to sense a voltage across terminals of the traction battery 124. The voltage sensor outputs a signal indicative of the voltage across the terminals of the traction battery 124. The traction battery current sensor outputs a signal indicative of a magnitude and direction of current flowing into or out of the traction battery 124.

The power conversion module 132 also includes a current sensor to sense a current that flows from the EVSE 138 to the traction battery 124. The engine 118 coupled to the electric machine 114 generates an AC current that is converted to a DC current by the power electronics module 126.

The engine 118 may be controlled by a powertrain control module having at least one controller in connection with the system controller 148. The current sensor of the power conversion module 132 outputs a signal indicative of a magnitude and direction of current flowing from the EVSE 138 to the traction battery 124.

The current sensor and voltage sensor outputs of the traction battery 124 are provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the traction battery voltage sensor 104. The specific technique utilized may depend upon the chemical composition and characteristics of the particular battery.

The controller 148 may be configured to monitor the status the traction battery 124. The controller 148 includes at least one processor that controls at least some portion of the operation of the controller 148. The processor allows onboard processing of commands and executes any number of predetermined routines. The processor may be coupled to non-persistent storage and persistent storage. In an illustrative configuration, the non-persistent storage is random access memory (RAM) and the persistent storage is flash memory. In general, persistent (non-transitory) storage can include all forms of storage that maintain data when a computer or other device is powered down.

An SOC operating range may be defined for the traction battery 124. The operating ranges may define an upper and lower limit at which the SOC of the battery 124 is bounded. During vehicle operation, the controller 148 may be configured to maintain the SOC of the battery 124 within the associated operating range. In this regard, the battery may be recharged by the engine while the vehicle is in operation. In other cases, the battery is recharged when at rest and connected to an off-board power source. Based on a rate of battery depletion and/or recharge, charging of the traction battery may be scheduled in advance based on approaching an SOC low threshold. The timing and rate of recharging may also be opportunistically selected to maintain voltage and SOC within predetermined ranges to avoid battery damage.

Figure 2:
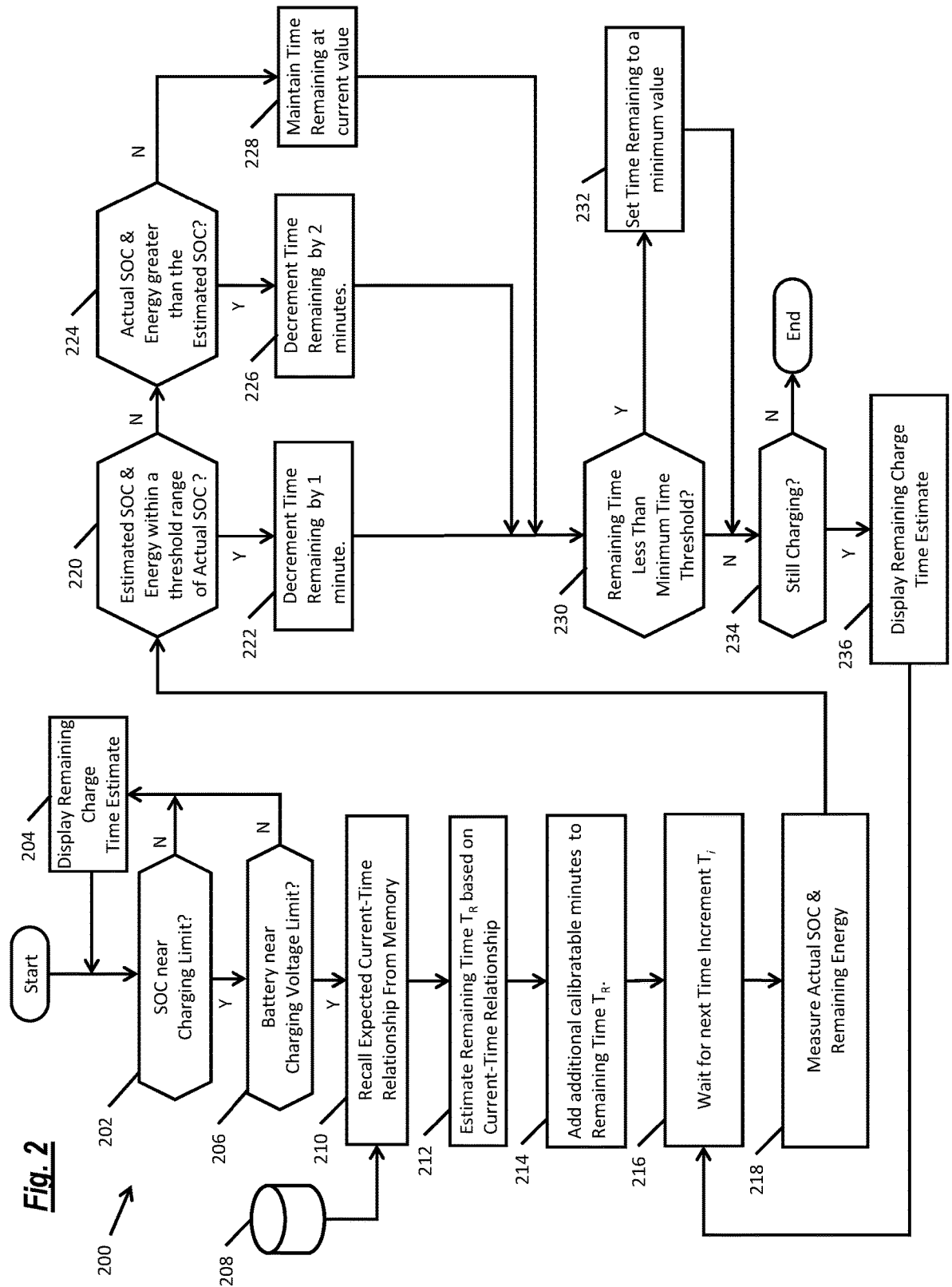
FIG. 2 is a method of controlling a battery recharge procedure.

Referring to FIG. 2, a method 200 of controlling a recharge procedure is used to maintain the battery at or slightly below its maximum charging voltage to prevent battery damage. At step 202 the controller measures the SOC of the battery. If the SOC is not near the charging limit, the method includes outputting at step 204 a remaining charge time according to traditional recharge calculation procedures. According to at least one example, a predetermined SOC threshold is used to determine whether SOC is near the charging limit. In a specific case, 80% is used as a predetermined SOC threshold above which to employ recharging procedures according to the present disclosure when the SOC is near the charging limit.

If at step 202 the battery SOC is near the charging limit, the controller assesses the battery voltage at step 206. At step 206, the controller assesses the battery voltage. If the battery voltage is not near the battery charging voltage limit at step 202, the method includes outputting at step 204 a remaining charge time according to traditional time calculation procedures. According to at least one example, a predetermined voltage threshold is used to determine whether battery voltage is near the charging limit.

If at step 206 the battery voltage is near charging limit, the controller enters a unique recharging mode to compensate for battery recharging differences when the battery is approaching a full charge. At step 210 the method includes recalling an expected current-time relationship stored in a memory of the controller. In alternative examples, the relationship is provided from an external source such as downloaded from a remote server. In further examples, the relationship is calculated real-time using a number of algorithms based on the current operating conditions. Discussed in more detail below, it may be desirable to recharge the battery according to a predetermined recharge profile which corresponds to an expected current-time relationship.

Referring to FIG. 3, a plot 300 is a representation of an example current-time relationship for a recharge procedure. Horizontal axis 302 represents time, and vertical axis 304 represents charge current supplied to the battery for recharge. Curve 306 represents a profile of recharge current supplied to the battery. As discussed above, recharge current 306 is reduced as the SOC and battery voltage approach maximum values. In some examples, the current entering the battery is modeled as an exponential function versus time, and this relationship may used to determine how much time it will take to reach a full battery charge. The exponential function can be predetermined, or based on present charging conditions, such as battery temperature and maximum charging current. At a start of recharge, a maximum current 308 is provided to the battery. Over time the charge current is reduced to regulate the recharge rate of the battery until the battery is fully charged at time 310. Based on any number of operating conditions such as battery temperature, battery age, voltage at the start of recharge, battery electrical loads, and other factors, the shape of the recharge current curve 306 may vary. In this way, any number of unique current-time relationship profiles may be stored to account for various operating conditions. In some examples, a plurality of lookup tables is stored in a memory including different current-time relationships that each correspond to a particular recharge profile. The controller may be programmed to store a plurality of expected current-time relationships and recall a particular recharge profile based on the vehicle operating conditions. Such profiles may be used to estimate both of an appropriate recharge current to be supplied to the battery, as well as a remaining charge time while the battery is near an SOC recharge limit or a voltage recharge limit.

Referring back to FIG. 2, the method includes recalling an expected current-time relationship from a memory. In one example, a database 208 stores a plurality of unique current-time recharge curves each corresponding to different vehicle operating conditions.

At step 212 the method includes estimating a remaining charge time $T_R$ based on a current-time relationship and recharge profile corresponding to the present vehicle operating conditions. In a specific example, at 80 percent SOC, remaining charge time is calculated by using a predetermined equation (e.g., by integrating a current formula such as $$e^{\frac{-t}{\tau}}).$$

The percentage used for employing the exponential function can be stored at a lookup table. The lookup table may be a function of time, and τ may be set to a constant value based on operating conditions (e.g., τ=8). The estimated remaining charge time $T_R$ may represent the time at which the SOC is estimated to reach 100% battery SOC.

Time may be added to the remaining charge time $T_R$ at step 214 to account for voltage and SOC variability near full charge. For example, a calibratable time (e.g., an initial value of 5 minutes) may be added to a previous remaining time estimate.

At step 216 the method includes holding for a predetermined time increment $T_i$. In some examples, the controller is programmed to periodically compare an estimated SOC to the measured SOC at predetermined time increments. In a more specific example, the time increment $T_i$ is about one minute. Once the time increment passes, at step 218 the method includes measuring the real-time battery SOC and/or remaining energy.

At step 220 the method includes comparing the measured actual SOC to an estimated SOC based on the expected current-time relationship determined at step 212. The controller calculates the estimated SOC at periodic time intervals and compares it with the actual SOC. In some examples, the expected SOC is a percentage of the cumulative Watt-hours predicted, divided by Watt-hours at top of charge. In a specific case, the cumulative watt hours predicted may be high-voltage traction battery voltage (e.g., 350V) multiplied by a calculated battery current divided by 60 (60 minutes for 1 Watt-hour). The cumulative watt hours predicted is then added to the prior cumulative watt hours.

If the estimated SOC and remaining energy are within a predetermined threshold of the actual SOC and energy, respectively, at step 220, the method includes decrementing at step 222 the remaining charge time by a standard time interval, such as one minute. Since the actual battery recharge conditions correspond to the estimated conditions, the remaining time estimate includes a sufficient degree of accuracy to not require an update to the charge time decrement amount. The controller may be programmed to decrement the remaining charge time according to a real-time pace in response to a difference between the estimated SOC and the measured SOC being less than a predetermined threshold range. According to some examples, if the estimate SOC is within 1.5% of the actual SOC a standard time interval is decremented. Further, the standard time interval is added to the lookup time used to determine the recharge current.

If at step 220 the actual SOC and remaining energy is outside of the predetermined threshold range, the method includes assessing the direction of the discrepancy at step 224. If at step 224 the actual SOC and remaining energy is greater than the estimated SOC and remaining energy, recharging may be proceeding faster than expected, and a greater than standard time duration is decremented from the remaining charge time at step 226. In other words, the controller may be programmed to decrement the remaining charge time by a duration greater than a standard time interval in response to a negative difference between an estimated SOC and a measured actual SOC. Thus, the controller may periodically reduce the remaining charge time by an update decrement amount that increases as an amount that an estimated SOC is less than a measured SOC increases. This acceleration of the decrementing of the remaining charge time may account for a recharge occurring faster than the current estimate near the top of charge. According to some examples, two minutes are subtracted from the remaining charge time based on the measured actual SOC being greater than estimated SOC.

If at step 224, the actual SOC and remaining energy is less than the estimated SOC and remaining energy, recharging may be proceeding slower than expected, and a less than standard time duration is decremented from the remaining charge time at step 228. According to some examples, no time is subtracted from the remaining charge time, and the time is maintained at the current value based on actual SOC being less than expected SOC. In other words, the controller may be programmed to maintain the remaining charge time responsive to the estimated SOC being greater than the measured SOC. In alternate examples, less than a standard time increment is subtracted from the remaining charge time estimate. This deceleration of the decrementing of the remaining charge time may account for a recharge occurring slower than the current estimate near the top of charge, and allow more time for additional power to be transferred to the battery.

Following any of the adjustments of remaining charge time discussed above at steps 222, 226, and 228, current is continued to be supplied to the battery. At step 230 the method includes assessing whether the remaining charge time is less than a calibratable minimum time threshold. Since the present disclosure may involve managing recharge procedures near full charge, small remaining charge time intervals may be involved. Below a remaining time threshold, the method may include setting the remaining time to a predetermined minimum value at step 232. In one example, the remaining charge time is set to $T_R=1$ minute when the calculated remaining charge time is less than the calibratable time increment minimum of one minute.

If at step 230 the remaining charge time is greater than the minimum time threshold, the method includes assessing at step 234 whether the charge procedure is still underway. If the charge is no longer underway at step 234, the procedure ends without generating a remaining charge time display.

If at step 234, the charge procedure is still underway, the method includes generating a remaining time display estimate at step 236. The method further includes looping back and re-assessing how close the actual battery parameters are relative to estimated parameters by returning to step 218.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a traction battery;
    a power interface configured to receive power from an off-board source; and
    a controller programmed to charge the traction battery with the power until expiration of an estimated remaining charge time, and to periodically reduce the remaining charge time by an update decrement amount that increases as an amount that an estimated state of charge (SOC) is less than a measured SOC increases, to reduce the remaining charge time by a first update decrement amount responsive to the amount that the estimated SOC is less than the measured SOC being less than a predetermined threshold, and to reduce the remaining charge time by a second update amount greater than the first update amount responsive to the amount that the estimated SOC is less than the measured SOC being greater than the predetermined threshold.

2. The vehicle of claim 1 wherein the controller is further programmed to maintain the remaining charge time responsive to the estimated SOC being greater than the measured SOC.

3. The vehicle of claim 1 wherein the controller is further programmed to store a plurality of unique current-time recharge profiles each corresponding to different vehicle operating conditions, and to set a recharge current and output the remaining charge time estimate based on at least one of the plurality of unique current-time recharge profiles.

4. The vehicle of claim 3 wherein the different vehicle operating conditions comprise at least one of a battery temperature, a battery age, voltage at a start of a recharge, and battery electrical loads.

5. The vehicle of claim 1 wherein the controller is programmed to periodically compare the estimated SOC to the measured SOC at predetermined time increments.

6. A method of controlling vehicle battery charging comprising:
    regulating current from a power interface to charge the battery based on a battery state of charge (SOC);
    charging the battery with the current until expiration of an estimated remaining charge time;
    periodically reducing the remaining charge time by an update decrement amount that increases as an amount that an estimated SOC is less than a measured SOC increases;
    reducing the remaining charge time by a first update decrement amount responsive to the amount that the estimated SOC is less than the measured SOC being less than a predetermined threshold; and
    reducing the remaining charge time by a second update amount greater than the first update amount responsive to the amount that the estimated SOC is less than the measured SOC being greater than the predetermined threshold.

7. The method of claim 6 further comprising maintaining the remaining charge time responsive to the estimated SOC being greater than the measured SOC.

8. The method of claim 6 further comprising recalling from non-transient storage at least one of plurality of unique current-time recharge profiles each corresponding to different vehicle operating conditions, and modifying a recharge current and outputting the remaining charge time estimate based on at least one of the plurality of unique current-time recharge profiles.

9. The method of claim 6 further comprising setting the remaining charge time to a predetermined minimum value responsive to the estimated remaining charge time being less than a minimum time threshold.

10. The method of claim 6 further comprising periodically comparing the estimated SOC to the measured SOC at predetermined time increments.

11. A vehicle comprising:
    a traction battery;
    a power interface configured to receive current from an off-board power source; and
    a controller programmed to
        store a plurality of recharge profiles each corresponding to different vehicle operating conditions,
        regulate current based on one of the recharge profiles to charge the traction battery until expiration of an estimated remaining charge time,
        maintain the remaining charge time responsive to an estimated state of charge (SOC) being greater than a measured SOC,
        reduce the remaining charge time by a first update decrement amount responsive to the amount that the estimated SOC is less than the measured SOC being less than a predetermined threshold, and
        reduce the remaining charge time by a second update decrement amount greater than the first update decrement amount responsive to the amount that the estimated SOC is less than the measured SOC being greater than the predetermined threshold.

12. The vehicle of claim 11 wherein the controller is further programmed to periodically reduce the remaining charge time by an update decrement amount that increases as an amount that an estimated SOC is less than the measured SOC increases.

13. The vehicle of claim 11 wherein the controller is programmed to select one of the plurality of recharge profiles based on vehicle operating conditions including at least one of a battery temperature, a battery age, voltage at a start of a recharge, and battery electrical loads.

14. The vehicle of claim 11 wherein the controller is programmed to periodically compare the estimated SOC to the measured SOC at predetermined time increments.

* * * * *